Feb. 13, 1968          I. C. TWILLEY          3,369,057
POLYAMIDE-POLYESTER DISPERSIONS WHEREIN THE POLYAMIDE
IS LESS THAN 40% AMINE TERMINATED
Filed May 18, 1964

INVENTOR
IAN C. TWILLEY
BY
*Robert A. Harman*
ATTORNEY

United States Patent Office 3,369,057
Patented Feb. 13, 1968

3,369,057
POLYAMIDE-POLYESTER DISPERSIONS WHEREIN THE POLYAMIDE IS LESS THAN 40% AMINE TERMINATED
Ian C. Twilley, Petersburg, Va., assignor to Allied Chemical Corporation, New York, N.Y., a corporation of New York
Filed May 18, 1964, Ser. No. 368,028
9 Claims. (Cl. 260—857)

ABSTRACT OF THE DISCLOSURE

Filaments are prepared of nylon having dispersed therein microfibers of polyesters. The compositions contain 50–90 parts by weight of nylon and 50–10 parts by weight polyesters. The nylon used has less than 40% amine end groups which are reactive with the polyester. The filaments may be used in the preparation of tires.

---

Figure 1:
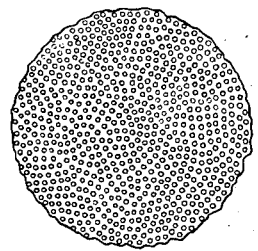

This invention is concerned with polyester dispersions in polyamides and with improved high strength yarns comprising polyester microfibers dispersed in polyamide; and more particularly with high strength continuous filament yarns of nylon having polyester dispersed therein and useful for example in the reinforcement of elastomeric structures and in other applications of high strength yarns.

Yarns obtained from the melt-spinning of polyamides such as those prepared by condensation of hexamethylene diamine and adipic acid, known as nylon 66, or by polymerization of e-caprolactam, known as nylon 6, are widely used in the yarn form or in cord form as the fibrous reinforcement in elastomeric tires and other industrial articles such as conveyor belts, seat belts, hoses, and the like, wherein high strength is required. Nylon yarns manufactured as tire yarns have high tenacity, of at least about 8.0 grams per denier; have good adhesion to rubber, requiring at least about 6 pounds tension to pull out a cord embedded in rubber in a standard test; and show very high fatigue resistance as measured by standard test.

One problem however in the use of nylon yarns as the reinforcing agent in elastomeric tires is that tires so constructed have a tendency to form "flatspots." The flat spot phenomenon occurs when tires having nylon fibrous reinforcement, after having been heated during travel, stand motionless supporting the weight of a vehicle for a few hours. During such period of standing, the flattened portion of the tire which is in contact with the ground develops a slight set which keeps this flat spot in the tire even when the vehicle is again driven, until the tire is again heated by travel. Accordingly when a car equipped with such tires is driven after standing an undesirable first impression of bumpy riding characteristics is created. This flat spotting is one manifestation of the property of plastic flow under stress, or "creep" as it is commonly called.

Another problem in using nylon tire yarns is that at the high curing temperatures preferred to shorten the tire manufacturing cycle, nylon tends to lose tensile strength. This problem is the more severe, the lower the melting point of the polyamide; e.g. at given high curing temperature the "cured strength loss" may be more pronounced for nylon 6 than for nylon 66.

Various means are known of producing nylon yarns with modified properties, including copolymerizing monomers; mixing different filaments together in one yarn; and blending polymers in the melt, thereby forming "block" polymers having long segments of each component and/or forming a dispersion of one polymer in the other.

In accordance with the present invention, a nylon polyamide, especially nylon 6 or nylon 66, and a polyester are formed into a dispersion, substantially free of "gel" particles. By gel particles is meant particles substantially larger than the average dispersed particles, both infusible large particles and fusible large particles formed by coalescence between the polyester particles and the polyamide, which particles are not reduced in size upon passage through a filtering bed and which will cause weak spots in filaments spun from the dispersion. These dispersions in accordance with the invention cna be processed into filaments in which the polyester forms microscopically fine reinforcing fibers dispersed throughout the polyamide filamentary structure, and lying predominantly lengthwise of the filament axis. These filaments of this invention are substantially free of gel particles; and have higher tensile modulus than do normal polyamide filaments from the same polyamide. Moreover, the yarns obtained in accordance with this invention have acceptable values of flat spot index, not greater than 26 by standard test; and have significantly lower cured strength loss than normal yarn of said polyamide, when embedded in rubber and the rubber subjected to vulcanization, while retaining the valuable properties of normal yarn of said polyamide.

Other objects and advantages will become apparent in the course of the following disclosure.

The dispersions and filaments of this invention have, per 100 parts by weight total polyamide and polyester, about 50 parts to about 90 parts of the polyamide as the continuous phase of the dispersion and dispersed therein about 50 parts to about 10 parts of the polyester, each as further defined below.

The polyamide is a nylon, i.e. a long chain polymeric amide capable of being formed into a filament displaying, by X-ray, orientation along the filament axis, having recurring amide linkages in the main polymer chain—i.e. recurring amide groups as an integral part of the main polymer chain; and the polyester is a long chain polymeric ester capable of being formed into a filament which may be but is not necessarily capable of orientation along the filament axis, as indicated by X-ray examination, and has recurring ester linkages and recurring cyclic structure in the main polymer chain.

Not more than about 40% of the polyamide end groups should be species, e.g. amine groups, which are reactive in the melt with the polyester. The disperions of the invention as obtained before and after being processed into filaments are heterogeneous as shown by the polyamide component being practically completely removable from the polyester component by leaching.

The polyamides particularly susceptible to improvement by this invention are those having glass transition temperature in the amorphous form, as measured by differential thermal analysis, not above about 45° C.; and having reduced viscosity between about 0.9 and 1.4, reduced viscosity herein being given throughout in units of dl./gm. as measured at concentration of about 0.5%, i.e. 0.5 gm. of polymer per 100 ml. of solution, in purified o-chlorophenol containing about 0.1% water at 25° C.

The polyester has a glass transition temperature in the amorphous form, as measured by differential thermal analysis, of at least 50° C., and higher than that of the polyamide; and has higher tensile modulus than the polyamide, suitably at least 50% higher, measured using the same method upon drawn filaments produced from the two polymers, which filaments have been drawn to give ultimate elongation of not above 20%.

Figure 2:
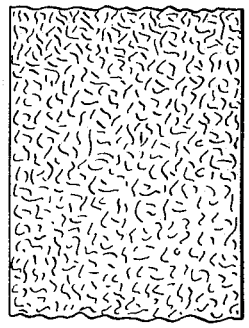
Figure 3:

In the accompanying drawings, FIG. 1 illustrates a cross section of a dispersion of this invention which has not been extruded; FIG. 2 illustrates the appearance of the polyester fibrils obtained by leaching away the polyamide from an extruded but undrawn filament; and FIG. 3 illustrates a longitudinal section of a drawn filament of this invention.

In accordance with the present invention the polymer dispersion must be heterogeneous, since chemical interaction of the components results in forming unprocessible gels. To avoid excessive formation of gels, the proportion of end groups of the polyamide, especially amine groups, which are reactive in the melt with the polyester should be restricted to not over 40% of the polyamide end groups. To this end, amine groups of the polyamide can be blocked, e.g. by being reacted with an acid. Polyamides having suitable end groups can be prepared in general by adjustment of the reactive ingredients during the polymer-forming reaction so that there are present an excess of acid groups in the reaction mixture over amine groups therein. Alternatively, polyamides partially or completely polymerized can be treated with terminating agents so as to cap or block the amine terminal groups present with a reagent which does not impart terminal amine groups. Examples of such terminating agents include monocarboxylic acids such as acetic acid, dicarboxylic acids such as sebacic acid, and other organic acids; also other reagents reactive with amines such as monoisocyanates, etc.

The minimum reduced viscosity of the nylons employed in this invention is about 0.9 corresponding to number average molecular weight of about 15,000. These polymers correspondingly have a total content of end groups of about 135 given in units of milliequivalents of end groups per kilogram of polymer. The polyamides to be used for this invention, accordingly, will generally have not above about 55 milliequivalents of reactive end groups such as amine groups per kilogram of polymer.

The glass transition temperature of a polymer, abbreviated $T_G$, may be defined as the temperature at which the polymer changes from a glassy or brittle condition to a rubbery plastic, or liquid condition. It is at temperatures in the vicinity of this glass transition temperature that the sharpest transition from the glass-like to the plastic or viscous mechanism of deformation appears. Thus in the vicinity of this $T_G$ there is a distinct change in the slope of curves of temperature versus tensile properties and other temperature-dependent physical properties. Below the region of glass transition temperature, physical properties of polymers in general are only slightly dependent upon temperature; whereas when temperatures rise into the $T_G$ region, a sharp decrease is observed in tensile and bending moduli, and tenacity; and a sharp increase is observed in elongation, shrinkage and creep, etc. In short, at and above its $T_G$ the polymer exhibits much greater deformation under given stress than at lower temperatures.

The phenomena observed at the glass transition temperature are due to changes occurring primarily in the amorphous regions of the polymer rather than being due to changes in the crystalline structure; but the degree of crystallinity of the polymer will generally influence the phenomena observed at the $T_G$ temperature and the value of $T_G$. In order to obtain optimum tire yarn physical properties, especially low flat spotting propensity, the glass transition temperature range of the yarn filament should extend at least as high as the temperatures developed during use of the tire. The usual method of increasing $T_G$ and thereby rendering synthetic polymeric fibers less temperature sensitive, is to increase the crystallinity of the structure. However, this expedient is generally accompanied by undesirable effects such as reduced adhesion to rubber and reduced fatigue resistance. The present invention confers improved elevated temperature properties, particularly resistance toward plastic deformation under stress and flat spotting, without adversely affecting adhesion to rubber and fatigue resistance.

The glass transition temperature can be measured by various specific methods, which may give slightly different results. For the purpose of this invention, $T_G$ is determined using a differential thermal analysis ("DTA") apparatus. Fusible polymers, unless free of crystallinity, are melted and quenched before the determination, to put them in amorphous form and thus minimize any variability in results due to varying crystallinity.

The sample is examined under nitrogen atmosphere in an aluminum sample holder. The heating rate is 4° C. per minute. A thermogram is recorded from room temperature up to any temperature desired (limit 1600° C.). The amount of sample used is approximately 2–5 milligrams.

The thermogram thus recorded will have at least one distinctive shift or peak interrupting the normally smooth curve recorded. Since various processes can occur upon heating polymers, the temperature region of interest for $T_G$ determination should be identified, suitably by rough observation of changes in a physical property such as stiffness with changes of temperature, so that the proper differential thermal analysis shift in the curve will be recognized. $T_G$ is taken as the lowest temperature at which a sharp change in curvature in the temperature region of interest, marking the beginning of a DTA shift occurs or, for greater precision, the intersection point of the tangent to the curve just below this temperature and the tangent to the low temperature leg of this shift.

Table I (appearing at the end of this specification) indicates the $T_G$ values, as determined by the above-described method, for some of the polyesters and polyamides useful in the practice of this invention. Since the $T_G$ value of any particular polymer specimen is affected by its previous thermal history, the results presented herein for each polymer are given as a range, within which range essentially all $T_G$ determinations on that polymer, made as above outlined, will lie.

In order to secure lower elongation under moderate tensile stresses, i.e. higher elastic modulus at ambient temperatures in accordance with this invention, the polyester ingredient in its amorphous form must have a $T_G$ value of at least 50° C. as measured by DTA and must be present in the blend to the extent of at least about 10% by weight of the polyamide/polyester composition. It is found, however, that at concentrations greater than 50%, where the polyester has a tendency to become the continuous rather than discontinuous phase, the yarn loses some of its adhesiveness to rubber, and exhibits lower values for ultimate elongation than desirable in yarns to be used for tire reinforcement.

The reduced viscosity of polymers, as employed in this specification, is determined by viscosity measurements carried out on a sample of polymer dissolved in purified orthochlorophenol containing 0.1% water, at 25° C. and concentration of 0.5%. Employing a standard Cannon-Fenske 150 bore viscometer, the flow time of the polymer solution ($t_p$) is measured relative to the flow time of the solvent ($t_s$), and the reduced viscosity is calculated using the following equation:

$$n_{red} = (n_r - 1)/C$$

where:

$n_{red}$ = reduced viscosity
$C$ = concentration of dissolved polymer in grams/100 ml.
$n_r$ = relative viscosity = $t_p/t_s$ In the case of polycaproamide, the reduced viscosity range usually used, viz. 0.9 to 1.4, corresponds approximately to the range of 40 to 100 formic acid relative viscosity, as determined at a concentration of 11 grams of polymer in 100 ml. of 90% formic acid at 25° C. (ASTM D–789–62T).

To secure the desired strength levels of at least 8 grams per denier in the yarns of the present invention, it is desirable that the polyamide component have relatively high reduced viscosity, preferably in the range of at least about 0.95 to about 1.3. However when the polyamide has excessively high reduced viscosity value e.g. above about 1.4 for polycaproamide, the high temperatures required in order to lower the viscosity of the polymer melt to a level suitable for spinning produce degradation of the blended composition, due e.g. to chemical interaction between the polyester and polyamide, and consequently produce lower strength yarns.

Polyesters useful in this invention can generally be identified by their having $T_G$ measured on the amorphous form by DTA of at least 50° C.; especially 50° C.–200° C., and being capable of being formed into filaments which can be drawn below the polyester melting point to at least four-fold the undrawn length; and by their having higher tensile modulus, especially 50%–250% higher, at normal ambient temperatures than does the polyamide ingredient when these moduli are measured by the same method upon drawn filaments produced from the two polymers and drawn to give ultimate elongations not above 20%.

In order to secure the desired tensile strength values above 8 grams per denier in yarns produced in accordance with this invention, the polyester ingredient must be of a filament-forming molecular weight; such polyesters in general will have reduced viscosity of at least about 0.5.

The viscosity of the polyester component should preferably be matched to the viscosity of the polyamide in such fashion that the polyester is drawable while embedded in the polyamide during extrusion and subsequent drawing operations. The following relationship has been found suitable for defining the preferred matching of polymer viscosities for industrial yarns and tire yarns:

$$2.0 \leq V_a/V_e \leq 0.9$$

wherein $V_a$ is the reduced viscosity of the polyamide, and $V_e$ is the reduced viscosity of the polyester. For other types of yarns, requiring less strength, the upper limit can be raised; and for yarns having less exacting spinning requirements the lower limit can be reduced.

When dispersed in molten or solid condition at temperatures in the ranges normally encountered during fabrication and use of said polyamide as a filament, viz. about 0° C.–300° C., a polyester having viscosity related as above specified to that of the polyamide requires greater tensile stress to produce a given elongation than does the polyamide; i.e. the polyester used has higher modulus of elongation than does the polyamide used in a composition in accordance with this invention. During melt extrusion of the polymer composition, and in subsequent hot or cold drawing operations, shearing stresses accordingly will develop especially at the polyamide-polyester interface. The development during drawing of the filament of said shearing stresses is believed to ail in the production of microfibers of the desired fineness, dispersed in the drawn polyamide yarn. The adhesiveness of polyamide to the polyester further promotes production of the desired fine polyester microfibers dispersed in the drawn polyamide yarn.

The polyesters useful in the practice of this invention can be prepared in general by condensation reactions between dicarboxylic acids or their derivatives and compounds containing two hydroxyl groups, or materials possessing both an alcohol group and a carboxylic acid group or derivative thereof; or by the condensation-polymerization of lactones. Dicarboxylic acid derivatives which can be employed include esters, salts, anhydrides, and acid halides. The monomeric species employed in the preparation of the polyesters are preferably not more highly functional than difunctional in their reactivity so as to produce essentially linear, non-crosslinked polymer structures.

Polyesters having a $T_G$ value of 50° C. and above, measured as above outlined, are generally found among those having recurring cyclic structures in the polymer chain. Such cyclic structures can be aromatic or saturated, and carboxylic or heterocyclic in nature. Preferred classes of polyesters of high $T_G$ useful in the practice of the present invention include those polymers in which one of the recurring units in the polyester chain is the diacyl aromatic radical from terephthalic acid, isophthalic acid, 5-t-butylisophthalate, a naphthalene dicarboxylic acid such as naphthalene 2,6 and 2,7 acids, a diphenyldicarboxylic acid, a diphenyl ether dicarboxylic acid, a diphenyl alkylene dicarboxylic acid, a diphenyl sulphone dicarboxylic acid, an azo dibenzoid acid, a pyridine dicarboxylic acid, a quinoline dicarboxylic acid, and analogous aromatic species including the sulfonic acid analogues; diacyl radicals containing cyclopentane or cyclohexane rings between the acyl groups; and such radicals substituted in the ring, e.g. by alkyl or halo substituents.

The dioxy radical representing the other principal recurring unit in the polyester chain can be an open chain aliphatic moiety such as ethylene glycol or ether thereof, e.g. the diether, or can contain rings such as those which form part of the above noted diacyl radicals. The carboxy and/or the oxy chain members can be directly attached to a ring or removed by one or more carbons therefrom, as in the 1,4 dioxymethyl cyclohexane radical.

Either or both the polyamide ingredient and polyester ingredient can be homopolymers or block or random copolymers, or a mixture of two or more such polymers. The polyamide will usually have both crystalline and amorphous regions; and the polyester can include a crystalline region or can be entirely amorphous. Groups other than amide and ester, respectively, may be present in minor amounts in these polymers, such groups including: carbonate, urea, urethane, ether, ketone, imidazole, oxazole, and other oxygen-containing moieties.

The polyester-polyamide blend composition employed for the spinning of yarns of this invention can be prepared by conventional polymer blending techniques. Both polymers can be dry blended in particulate form prior to melting; conveniently the particulate polyester material can be in a state of subdivision, wherein the ratio of polyester particle size to polyamide particle size is adjusted to provide roughly the same number of particles of each in the final composition; thus the smaller the proportion of polyester, the smaller will be the ratio of its particle size to that of the polyamide. Subsequent to melting, such mixture should be subjected to high shear to secure satisfactorily fine and uniform dispersion of the polyester throughout the polyamide phase.

Alternatively the two polymer components can be mixed in molten form and subjected to melt homogenization.

Moreover the polyester can be added to the polyamide component in the form of a concentrated dispersion in a polyamide, said dispersion being produced for example by dispersing finely divided polyester in a liquid lactam and polymerizing the lactam ingredient at temperatures below the melting point of the resulting polyamide, e.g. by anionic polymerization of said lactam using any of the known anionic catalyst-promoter systems especially a carbonate ester promoter. The polyester can also be added in a particulate form wherein said particles are coated with polyamide by having been treated with a solution of polyamide in a non-solvent for the polyester.

The polyester must be finely dispersed in the melt of polyamide from which filaments are to be formed in accordance with this invention. Such dispersion can be secured by subjecting the melt to high shear as in an extruder, impeller agitator, or analogous device. A very good dispersion is assured by forcing the resulting melt through a pack of screens, through a sintered plate, and/or through a sand bed or like fine filtering passages. The polyester in the dispersions of this invention, ready for spinning, suitably has average particle diameter of 0.5–5 microns, which is generally uniform with an standard deviation of ±.2 micron.

Thermally stable dispersing agents can be employed to facilitate obtaining the desired dispersion and increase the stability thereof. Once formed, the dispersion should not be maintained in molten condition for extended periods without agitation, since agglomeration and settling of the polyester may occur.

Although the polyester is insoluble in the polyamide it is found that at the required fine state of subdivision, changes of viscosity and/or formation of gel-like particles are observed unless reactive end groups of the polymers are blocked as previously discussed. Moreover in producing the blended polymer compositions of this invention it is necessary to maintain moisture content below 0.1% by weight at least during the operations in the melt in order to avoid hydrolytic decomposition of the polyester component and to avoid polymer interactions.

Various ingredients may be incorporated into the polymer components either prior to or during the blending operation, said ingredients including: stabilizing agents especially copper compounds and /or ketone-diarylamine condensation products which protect the polymer against adverse effects of heat, aging, oxidation, and ultraviolet light; reinforcing particles such as silica, and carbon block; adhesion-promoting agents; fluorescent materials; and dispersing agents to facilitate and maintain dispersion of the polyester particles.

These dispersions can be cooled from the melt and pelleted for use e.g. as molding compositions; they can also with particular advantage be spun into filaments.

The filaments and yarns of the present invention can be prepared from the herein-described polymer dispersions by conventional melt spinning techniques. Extrusion temperatures in the range of 260°–315° C. are usually suitable and extrusion pressures between 1000 and 6000 p.s.i. The extrusion temperature in preferred embodiments will be at least about 15° C. above the melting point of the higher melting polymer component of the blend. However, in some instances, the blends of this invention will permit the spinning of mixtures at temperatures below the normal melting point of the polyester component.

The spinneret apparatus will generally be preceded by the usual filtering means such as a pack of wire screens, and a sand bed which serve to eliminate foreign particles, especially gel particles, which would create inhomogeneities and weak spots in the final filament. The dispersion to be spun must, for practical reasons, be substantially free of gel particles so that it will pass through the filter satisfactorily at pressures such as 1000–6000 p.s.i. and will produce a yarn of uniformly high strength. The filtered polymer is then extruded as usual through round or non-round orifices into a cooling zone in which the extrudate solidifies.

The cooling zone preferably consists of a confining chamber containing a controlled flow of air or other suitably inert gas at temperatures which cause rapid solidification of the extrudate. The solidified filaments can be wound up at speeds such as 1000–2000 feet per minute at tensions producing low birefringence, such as tensions typically about .01 gram per denier. The as-spun yarns preferably have a birefringence not above 0.01, birefringence being defined as the difference in refractive index longitudinally vs. that perpendicular to the axis of the filament.

The filaments are subjected to a drawing operation at temperature below the polyamide melting point to confer molecular orientation along the filament axis and increase the strength of the filaments. A draw ratio in the range 4–6 has been found to impart maximum yarn strength. The drawing operation is preferably carried out with the aid of a draw pin which localizes the region of drawing. The yarn can be drawn in either a single or successive stages, and at least one of said drawing stages is best carried out while the yarn is heated e.g. to a temperature in the range of 175°–195° C. for nylon 6 yarns. The heat can be applied to the yarn by known means such as stationary or rotating contact heaters, steam chambers, heated liquid sprays or baths, infra-red, radio frequency heating, and other means.

Finishing compositions comprising lubricating ingredients and/or wax can be applied to the yarn prior to drawing to facilitate the drawing operation. Prior to packaging, or in subsequent operations, the drawn yarn can be subjected to annealing at constant length or to relaxation with controlled shrinkage in order to reduce the shrinkage and/or increase the ultimate elongation of the yarn, particularly when it is to be used for seat belts or power transmission belts. One suitable method of effecting such treatments is disclosed in Wincklhofer U.S. Patent 2,859,472, issued Nov. 11, 1958. The drawn yarn can be subjected to treatment with ionizing radiation, ultrasonics, crosslinking agents such as formaldehyde and isocyanates, and other finishing treatments to secure various desired effects.

In the drawn filaments of the present invention, the polyester ingredient is dispersed as discrete microfibers throughout the polyamide filament which forms a continuous phase or matrix. These polyester microfibers have average diameter not above 1 micron and preferably not above 0.5 micron. In length the microfibers vary widely, but practically all are elongated. On the average they are at least 5 times and usually at least 20 times longer than the average diameter, typically averaging in length about 250 times their average diameter. In the drawn filaments, the microfibers lie predominantly in the direction of the filament axis. The dispersion of microfibers in the filament is substantially uniform, both lengthwise and across each filament. Typically at least 100 microfibers traverse each cross-section of each filament.

The microfibers will generally have essentially round cross section, although their diameter may vary along their length and they may taper toward their ends as a result of the shears imposed during drawing. Although these microfibers increase the tensile modulus of the yarns, their effect on bending modulus (i.e. flexibility) is negligible in view of their extremely small diameter and their dispersion with their axes along the filament axis; and as a result the drawn yarn retains the fatigue characteristics of the polyamide component.

The yarns of this invention are not visibly distinguishable by the unaided eye from yarns spun to the same denier from straight polyamide polymer. The invisibility of the microfibers by ordinary means of observation can be attributed to the fineness of the microfiber structure and the intimate contact of the two polymer phases. The microfibers will, however, be discernible in the yarn by photomicrographs of cross sections of the yarn viewed at magnifications of about 4000 diameters. Advantageously for viewing or photographing, the specimen cross section is immersed in a boiling .07% aqueous solution of Brilliant Acid Blue dye for one hour. The microfibers can also be examined by selectively leaching away the polyamide component in 90% formic acid and filtering to obtain microfibers. The microfibers can then be observed microscopically in their lengthwise dimension using magnifications of at least 40 diameters.

A Coulter counter as used in the study of pigment particle sizes can be used to advantage in examining the isolated particles of polyester obtained from dispersions which have not been spun.

The various drawn polyamide/polyester yarns of this invention, prepared as above outlined with or without additives, special treatments, etc., have tensile modulus higher than that of the polyamide ingredient in the form of a similar drawn yarn, and generally have tensile modulus of at least about 50 grams per denier. These yarns have general utility wherever a yarn is desired which has higher tensile modulus at ambient temperatures than does normal yarn of the same polyamide; and/or lower boil-off shrinkage, lower ultimate elongation, lower creep, lower moisture absorption than polyamide yarns similarly processed. Their utility for special purposes is further shown by the tests outlined below.

A test for the flat spotting propensity of a given yarn is known to correlate well with actual performance of yarns in tires reinforced therewith. The details of the standard test procedure are as follows:

Conditioning the specimens:

(1) Suspend two 20-inch specimens of 840 denier yarn in an oven (a glass tube jacketed for heating by steam) containing dry nitrogen.

(2) Apply a 0.5 g./d. load to each specimen and heat oven to 105° C.; hold temperature and load for one hour.

(3) Cool oven to room temperature and increase load to 0.75 g./d.; hold for 30 minutes.

(4) Heat oven to 105° C.; hold for one hour.

(5) Cool oven to room temperature; and hold for 30 minutes.

(6) Reduce load to 0.50 g./d. Heat oven to 105° C.; hold for 16 hours.

(7) Cool oven to room temperature and hold for 30 minutes.

The conditioned specimens are tested as follows:

(8) Heat oven to 105° C.; hold for 20 minutes.

(9) Reduce load on one specimen (yarn B) to 0.25 g./d., hold for 5 minutes, then cool oven to room temperature (approximately 20 minutes).

(10) Increase load on yarn B to 0.5 g./d. Observe length of specimens after 30 seconds.

The flat-spot index is taken as the difference in length between the two specimens after reapplication of load in step 10, expressed in millimeters and multiplied by ten. By this test method, ordinary nylon tire yarns would have a value of about 31, rayon tire yarns would have a value of about 5, and polyester tire yarns would have a value of about 11. In the construction of a typical four-ply passenger vehicle tire of 14-inch radius, a yarn having a flat spot index of 26 will generally produce a tire which under ordinary conditions of operation will develop a flat spot of about .160 inch as measured between the flattened portion or chord, and the normal tire periphery; and this degree of flat spot formation is generally considered to be the level of perception in the riding characteristics of a car equipped with such tires. The yarns of this invention have flat spot indices not greater than 26, and are thus satisfactory for the production of tires of normally imperceptible flat spotting tendencies.

The cured strength loss property of the yarns of this invention is determined by measuring the strength retained by a cord made from the yarn of this invention when said cord is embedded within rubber under fixed length conditions, and then allowed to shrink freely after vulcanization. The test method simulates standard tire fabrication employing a high temperature, short cure cycle. In the actual test procedure, two-ply 12 x 12 cords, preconditioned at 65% relative humidity are placed between two 50 mil thicknesses of natural rubber stock, the surfaces of which have been coated with butyl cement to prevent adhesion of the cord to the rubber. The sandwich assembly so formed is placed in a mold and the cord is clamped with screws to maintain fixed length conditions during curing. The assembly is then vulcanized in the mold for 25 minutes at 350° F. To simulate tire ejection, after curing, the mold is opened while still hot and the cords are released by cutting across the vulcanized assembly near the clamping screws. After conditioning at 65% relative humidity and 70° F., the cords are stripped from the rubber and the tenacity retained is determined. The cured strength loss is the percent loss in tenacity.

All tensile property measurements reported herein were carried out on 10 inch specimen samples, using an Instron Tensile Tester operated at a constant speed of cross-head separation of 6 inches per minute at normal ambient temperature (about 20° C.).

The adhesion test employed herein is the standard "H" adhesion test employing two-ply cords of the yarn to be tested, coated with the standard resorcinol-formaldehyde-latex adhesive finish, and employing natural rubber as the elastomeric substrate. In the test method, the force in pounds is measured for pulling, in the axial direction, one test cord from a laminate of rubber with a quarter inch length of cord embedded therein, said laminate being maintained at 250° F. In the preparation of the test laminate, the adhesive-treated cord is placed between two thicknesses of rubber stock in a mold with the cord under a tension of 50 grams.

The sandwich assembly is then vulcanized in the press for 30 minutes at 280° F. under a 250 p.s.i.g. load. By this method, a nylon 6 yarn will generally provide an adhesion test value of about 13 pounds. Test values below 6 pounds are generally considered indicative of unsatisfactory adhesion.

The standard fatigue resistance test employed upon the yarns of the invention was the Goodrich disc fatigue test (ASTM D 885).

The practice of this invention is further illustrated in the following examples, wherein all parts and percentages are by weight unless otherwise specified. It is to be understood that "polycaproamide" of the below examples is poly-e-caproamide, leached with hot water to content of not above 3% by weight of hot water extractible ingredients; and dried. Like operations can be performed with poly-e-caproamide containing higher extractibles e.g. up to about 10%.

*Example 1*

Granular polyethylene terephthalate polymer was used, melting about 255° C. (DTA) and about 265° C. (optical), having density (when amorphous) of about 1.33 gm. per ml. at 23° C., and about 1.38 gm./ml. in the form of drawn filament, having reduced viscosity of about 0.85 and having $T_G$ about 65° C. The polyester in the form of drawn filament drawn to give ultimate elongation not above 20% will have tensile modulus (modulus of elasticity) ranging from about 70 to about 140 gm. per denier, depending on spinning conditions employed.

This polyester analyzed about 58 milliequivalents of carboxyl groups and about 60 m. eq. of hydroxyl groups per kilogram. Carboxyl groups in the polyester were determined by dissolving the sample in benzyl alcohol at about reflux temperature of the alcohol and immediately cooling the solution at room temperature for a few seconds, and pouring into chloroform. The resulting solution was titrated with sodium hydroxide in benzyl alcohol to the phenolphthalein end point. The polyester hydroxyl groups were determined by heating a solution of polyester in 1-methylnaphthalene with succinic anhydride for 4 hours at 175° C. and purifying the resulting polymer by precipitating in ethanol, redissolving in 1-methylnaphthalene, reprecipitating in ethanol, filtering, and drying; then analyzing for carboxyl groups as above outlined. The increase in millimols of carboxyl groups over the original value is taken as the value for the hydroxyl groups in the sample.

This polyester (30 parts) was mixed with 70 parts of granular polycaproamide having reduced viscosity about 1.04, $T_G$ about 35° C. and density about 1.14 gm. per ml. at 23° C. Amine groups in this polycaproamide had been blocked by reaction with sebacic acid, bringing the amine group analyses thereof to 11 milliequivalents of $NH_2$ groups per kilogram of polymer, as determined by the method outlined in Example 6 below. This polycaproamide contained as heat stabilizer, 50 p.p.m. copper as cupric acetate.

The mixture of polyamide and polyester granules was blended in a double cone blender for 1 hour. The granular blend was dried to a moisture content of no more than 0.01%; then melted at 285° C. in a 3½" diameter screw extruder operated at a rotational speed of about 39 r.p.m. to produce a pressure of 3000 p.s.i.g. at the outlet.

A dry nitrogen atmosphere was used to protect the blend against absorbing moisture. Residence time in the extruder was 8 minutes.

The molten mixture thereby obtained had melt viscosity of about 2000 poises at 285° C. The polyester was uniformly distributed throughout and had average particle diameter of about 2 microns, as observed by cooling and solidifying a sample of the melt, leaching out the polyamide component with formic acid, and examining the residual polyester material.

The molten mixture was pumped through a filter pack including a series of screens and a sand bed under a pressure of 2000 p.s.i.g. and at a temperature of 285° C., and was extruded through a spinneret plate having 136 orifices of circular cross section, each of said orifices having a diameter of .013 inch. The resulting filaments proceeded downwardly through a quenching chamber containing air at 28° C. and 65% relative humidity flowing cocurrent to the filaments at a rate of about 37 cubic feet per minute. The yarn was taken up onto a cylindrical package below the quenching chamber at a speed of 1350 feet per minute under a tension of 40 grams. Just prior to packaging, a lubricating finish was applied to the yarn to the extent of about 5% pick-up based upon the weight of the yarn. The yarn thus obtained has an approximate denier of 4600 and a birefringence of .006.

The yarn thus produced was then subjected to a draw-twisting operation by running the yarn to an upper draw roll provided with a cot roll to prevent yarn slippage, then in a single wrap about a stationary ceramic draw-pin of 1½" diameter, then to a contact surface heater at 185° C., and then in five wraps about a lower draw roll and associated separator roll. By operating the lower draw roll at a peripheral speed 5.4 times faster than the upper draw roll, the yarn was drawn 5.4 times its initial length. The yarn was subsequently wound onto a pirn at a rate of 840 feet per minute using a ring-traveler device so as to impart 0.4 turn per inch of twist to the yarn. The yarn thus obtained is found to have the properties which in Table A below are compared to the properties of a polycaproamide yarn produced similarly but without incorporating polyester therein.

TABLE A

| | Comparison | |
|---|---|---|
| Denier | 840 | 840 |
| Density, gm./ml. at 23° C | 1.2 | 1.14 |
| Ultimate Tensile Strength, grams per denier | 9.6 | 9.0 |
| Ultimate Elongation, percent | 14 | 17 |
| Tensile Modulus, grams per denier | 70 | 35 |
| Shrinkage, percent | 12 | 15 |
| Flat Spot Index | 19 | 31 |
| Cured Strength Loss, percent | 4 | 53 |
| Adhesion, lbs | 11.0 | 12 |

Formic acid leaching of the drawn yarn and microscopic examination showed presence of dispersed polyester microfibers having an average diameter of about 0.3–0.4 micron and average length of 100 microns. These fibers lay generally lengthwise of each filament and numbered at least 100 through each cross-section of each filament.

The fatigue resistance was measured upon a yarn like that of this example but containing 40 p.p.m. of copper and 0.3% by weight of "BXA" (trade name of a Naugatuck Chemical Div. antioxidant further described in U.S. Patent 3,003,995 to Schule, issued Oct. 10, 1961); and was compared to that of a standard nylon 6 tire yarn of known very excellent fatigue resistance, using the Goodrich disc fatigue test (ASTM D 885). The yarn of this invention thus tested showed at least 90% of the fatigue resistance of the standard nylon 6 tire yarn used for comparison.

For purposes of comparison, a blend was formed from the same ingredients and was subjected to the same procedures as in the above example, except that, instead of the acid blocked nylon 6 polyamide, nylon 6 polymer of the same viscosity was employed, having 52 milliequivalents of acid groups, and 48 milliequivalents of amine groups per kilogram of polymer, i.e. with 48% of the end groups being a species reactive with polyester. It was found that gel-like particles were formed in the molten blend, probably by interaction of the polymers, making production of acceptable continuous filaments by use of the above extrusion apparatus impossible as a practical matter.

*Example 2*

Employing the polymers and process of Example 1, a series of yarns with different weight ratios of polyester/polyamide were prepared, and the properties of said yarns were determined. The nature of the yarns prepared and their properties are presented in Table II below, at the end of this specification.

Examination of the data of Table II indicates that, for the specific polymers employed in this Example, 10 parts by weight of the polyester per 100 parts of total polyamide and polyester produces a sharp improvement in the cured strength loss property of the yarn. At 50 parts per 100 of polyester, however, the adhesion of the yarn depreciates to borderline acceptability, unless special treatments were employed to render the yarn more adhesive. Samples B, C, and D of Table II are also seen to have acceptable levels of tenacity and elongation.

*Example 3*

Various yarn samples were prepared employing the procedure of Example 1 and similar polymers, except that polycaproamide polymers of different viscosity were employed in each of the different tests and the spinning temperature was adjusted to secure a melt viscosity adequate to permit spinning. The samples prepared and their tenacities are reported in Table III at the end of this specification.

As the data of Table III indicate, there is a sharp decrease in yarn tenacity at values of polyamide reduced viscosity below about 0.9. At polyamide reduced viscosity values above about 1.4, it is seen that tenacity again begins to decline. This decline is believed to be due to the chemical interaction and/or decomposition of the polymer system at the high working temperatures necessitated by the relatively high melt viscosity of these polymers.

*Example 4*

To exemplify the effect of various polyesters of different $T_G$ values on the properties of the yarns of this invention, a series of polymer blends was prepared and converted into yarns by the process of Example 1. The samples prepared, and test results obtained are reported in Table IV at the end of this specification.

As the data of Table IV indicate, 10 parts by weight of polyester per 100 parts of total polyamide and polyester suffice to bring the flat spot index of the yarn to satisfactory values, below the level of perception as defined hereinabove. It is also shown that, as the $T_G$ value approaches the lower limit of 50° C., the polyester ingredient, even at concentrations of 30%, begins to lose effectiveness in lowering the flat spot index.

*Example 5*

To clearly establish the heterogeneity of the composite filaments of the yarns of this invention and the absence of occurrence of block copolymerization between the two polymer components, the yarns of Example 2 were subjected to leaching with 90% formic acid at 27° C. for one hour. In each case the amount of material leached out by the formic acid was determined. The tests performed and data obtained are presented in Table B below. Since the formic acid dissolves polyamide and not polyester, the data of Table B demonstrate that little if any block copolymerization exists in the yarns of this invention, and that the system is heterogeneous.

TABLE B

| Sample: | Percent soluble in formic acid |
|---|---|
| A | 100 |
| B | 93 |
| C | 72 |
| E | 2 |

Moreover the yarns of the present invention, when subjected to a melting point determination by methods of differential thermal analysis yield two distinct melting points corresponding to the polyamide component and the polyester component when both components are crystalline in nature. This is a further characteristic indicating the heterogeneity of the system, said heterogeneity leading to the securement of the desired objectives of the present invention.

*Example 6*

To demonstrate the importance of the nature of the polyamide end groups in the polymer blends of this invention, the rheologies of various 30/70 (polyester/polyamide) blends were investigated on a standard Brabender Plastograph mixing head. The polyester employed in each sample was the same as that employed in Example 1. The polyamide components were polycaproamides of various reduced viscosities and terminated with different amounts of acetic acid, and containing 0.6% by weight of "BXA" (trade name of a Naugatuck Chemical Div. antioxidant), a reaction product of acetone and diphenylamine formed at relatively high temperatures and high pressures, further described in U.S. Patent 3,003,995 to Schule, issued Oct. 10, 1961.

The three types of end group present, viz. amine, carboxyl, and acetyl, were determined by dissolving samples of the polymer in o-cresol, benzyl alcohol, and phosphoric acid/o-xylene 3:1 by volume mixture respectively. The amine groups were titrated wtih p-toluenesulfonic acid in methanol to the thymol blue end point; the carboxyl groups were titrated with sodium hydroxide in benzyl alcohol to the phenolphthalein end point; and the acetyl groups were determined by distilling off the o-xylene/acetic acid azeotrope and titrating it with aqueous sodium hydroxide to the phenolphthalein end point.

The polymer blends were formed in a double cone blender at 70:30 weight ratio of polyamide:polyester, as in Example 1. Samples were charged to the mixer and tested under nitrogen atmosphere at 265° C. temperature and 60 r.p.m. mixing rate.

The mol ratios of amine groups:carboxyl plus acetyl groups in the samples tested, and results obtained, are reported in Table V at the end of this specification.

As the data of Table V demonstrate, when the polyamide has amine:non-amine end group ratio of 0.67 and lower, i.e. has a proportion of end groups reactive with polyester not over 40% of the total end groups, the blend exhibits viscosity stability under these conditions of high shear in the melt. In samples A, B, C, and F, within the purview of this invention, leaching with formic acid removed the polyamide component in its original amount, leaving the polyester as small spherical particles averaging 3 microns in diameter. In samples D, E, G, and H, outside the scope of this invention, leaching with formic acid removed less than the initial amount of polyamide and left a gelatinous residue. The results thus indicate that, at end group ratios above about 2:3 of amine end groups to unreactive end groups, chemical interaction occurs between polyester and polyamide, causing undesirable viscosity changes in the melt, and interaction with gelling between the dispersed polyester phase and polyamide continuous phase.

The novel yarn product of this invention is eminently suitable as a tire yarn. It is also useful in yarn, cord or staple form in general in applications wherein high strength and/or exceptionally low creep and/or low elongation under stress may be desirable, such as for example, ropes, netting, safety seat belts, parachutes, tarpaulins, inflatable structures, bagging, plastics reinforcement, draperies. The yarns are useful in various deniers, although for tire use, yarn deniers in the range of 700 to 4000 are preferable, said yarns having a filament denier in the range of 4 to 10. The individual filaments may have various cross-sectional configurations such as multilobal, heart-shaped, and polygonal in asymmetric or symmetric designs.

TABLE I

| | $T_G$, ° C. | Morphology |
|---|---|---|
| Polyethylene terephthalate | 60–70 | Crystallizable. |
| Polyethylene 2,6 naphthalene dicarboxylate. | 100–110 | Do. |
| Polyethylene 2,7 naphthalene dicarboxylate. | 100–110 | Amorphous. |
| Polyethylene isophthalate | 50–55 | Do. |
| Polyethylene 5-t-butyl isophthalate | 75–80 | Do. |
| Poly 1,4 cyclohexylene dimethylene terephthalate. | 60–70 | Crystallizable. |
| Polyhexamethylene 4,4 diphenyl sulphone dicarboxylate. | 60–70 | Do. |
| Poly m-xylylene isophthalate | 115–125 | Amorphous. |
| Poly 1,4 cyclohexylene dimethylene 5-t-butyl isophthalate. | 80–90 | Do. |
| Polyethylene m,m'-azodibenzoate | 105–120 | Do. |
| Poly 2,2'-(4,4'-dihydroxydiphenyl) propane isophthalate. | 180–200 | Crystallizable. |
| Nylon 6 | 30–40 | Do. |
| Nylon 66 | 35–45 | Do. |

TABLE II

| Sample | Blend Composition [1] | Tenacity (g.d.) | Elongation [2] | Adhesion (lbs.) | C.S.L.,[3] percent |
|---|---|---|---|---|---|
| A | 0/100 | 8.9 | 16 | 13 | 53 |
| B | 10/90 | 8.8 | 14 | 13 | 16 |
| C | 30/70 | 8.7 | 12 | 11 | 4 |
| D | 50/50 | 8.5 | 9 | 6 | 13 |
| E | 100/0 | 8.5 | 6 | 4 | 14 |

[1] Polyester/polyamide (by weight).
[2] Ultimate elongation of the yarn (percent).
[3] Cured strength loss.

TABLE III

| Polyamide Reduced Viscosity | $V_a/V_c$ | Yarn Tenacity | | Spinning Temperatures (° C.) | |
|---|---|---|---|---|---|
| | | 50/50* | 30/70* | 50/50 | 30/70 |
| .80 | .94 | 7.0 | 4.0 | 273 | 278 |
| .95 | 1.12 | 9.2 | 8.2 | 277 | 280 |
| 1.03 | 1.21 | 9.5 | 9.2 | 281 | 285 |
| 1.22 | 1.43 | 9.5 | 9.2 | 289 | 302 |
| 1.35 | 1.59 | 8.7 | | 295 | |
| 1.5 | 1.76 | 6.0 | | 315 | |

*Polyester/polyamide (by weight).

TABLE IV

| Polyester | $T_G$ (°C.) | Polyamide | Composition | F.S.I. | C.S.L., percent | Adhesion (lbs.) |
|---|---|---|---|---|---|---|
| Polyethylene 2,6 naphthalene dicarboxylate | 110 | Nylon 6 | 10/90 | 26 | 16 | 12 |
| Polyethylene 2,7 naphthalene dicarboxylate | 110 | ___do___ | 40/60 | 13 | 6 | 7 |
| Polyethylene 5-t-butyl isophthalate | 75 | ___do___ | 25/75 | 21 | 3 | 11 |
| Do | 75 | ___do___ | 35/65 | 17 | 9 | 10 |
| Polyethylene isophthalate | 50 | ___do___ | 30/70 | 24 | 4 | 10 |
| Polyethylene terephthalate | 65 | Nylon 66 | 40/60 | 18 | 2 | 9 |
| Polyethylene 2,6-2,7 naphthalene dicarboxylate 2:1 ratio | 110 | ___do___ | 20/80 | 17 | 4 | 11 |

[1] $T_G$ of the polyester component.
[2] Polyester/polyamide (by weight).
[3] Flat spot index.
[4] Cured strength loss.

TABLE V

| Sample | Polyamide Reduced Viscosity | End Group Ratio [1] | Rate Change of Melt Viscosity [2] |
|---|---|---|---|
| A | 0.90 | 0.03 | 3 |
| B | 1.04 | .10 | 3 |
| C | .98 | .5 | 6 |
| D | 1.04 | 4.0 | 68 |
| E | .95 | 3.2 | 64 |
| F | 1.10 | .66 | 14 |
| G | .90 | .89 | 43 |
| H | .93 | 1.9 | 60 |

[1] Amine end groups/non-amine end groups (equivalents).
[2] In Brabender Plastograph units/minute.

What is claimed is:

1. A drawn filament of polyamide, i.e. long chain polymeric amide capable of being formed into a filament displaying, by X-ray, orientation along the filament axis and having recurring amide groups as an integral part of the main polymer chain, said polyamide having dispersed therein microfibers of a polyester having recurring ester linkages and recurring cyclic structure in the main polymer chain said polyester being capable of being formed into a filament, and having glass transition temperature when in the amorphous form of at least 50° C. as measured by differential thermal analysis and higher than that of the polyamide ingredient of the filament and having higher tensile modulus than the polyamide ingredient measured similarly; said microfibers having average diameter not above 1 micron and having average length at least 5 times their average diameter and lying predominantly in the direction of the filament axis and being practically completely removable from the polyamide by leaching out the polyamide from the filament; the proportions of said polyamide and said polyester being from about 50–90 parts by weight of polyamide and about 50–10 parts by weight of polyester per 100 parts by weight total polyamide and polyester; and in said polyamide not more than about 40% of the end groups being amine end groups said polyamide having reduced viscosity, determined in ortho-chlorophenol at 25° C. and concentration of 0.5 gram per 100 milliliters of solution, in the range of about 0.9 to about 1.5 dl./gm. and said polyamide and polyester reduced viscosities being in ratio between about 2 and about 0.9 for ratio of polyamide reduced viscosity:polyester reduced viscosity; said drawn filament having ultimate tensile strength of at least 4 grams per denier.

2. A multifilament yarn of filaments of claim 1 having tensile modulus of at least about 50 grams per denier and higher than that of the nylon ingredient in the form of a similar drawn yarn when measured similarly, having flat spot index not greater than 26 by standard test, and having tenacity of at least 8 grams per denier.

3. A cord of multifilament yarn of claim 2, embedded in rubber, having adhesion value by standard test of at least 6 pounds pull.

4. Filament of claim 1 wherein the microfibers have average length at least 20 times their average diameter and number at least about 100 traversing each cross-section of the filament.

5. Filament of claim 4 wherein the nylon is poly-ε-caproamide of which not more than 40% of the end groups are amine end groups and wherein an aromatic ring is a recurring structure in the polyester chain; the microfibers have average diameter not above 0.5 micron; the length of the microfibers averages not less than 250 times their average diameter; and said filament is a multifilament yarn having tenacity of at least 4 grams per denier.

6. Filament of claim 5 wherein the polyester is polyethylene terephthalate.

7. Filament of claim 6 containing at least one stabilizing agent of the group consisting of copper compounds and ketone-diarylamine condensation products.

8. Filament of claim 4 wherein the nylon is the condensation product of hexamethylene diamine and adipic acid, not more than 40% of the end groups of said nylon being amine end groups; and wherein an aromatic ring is a recurring structure in the polyester chain.

9. Filament of claim 8 wherein the polyester is polyethylene terephthalate.

References Cited

UNITED STATES PATENTS 2,174,527  10/1939  Peterson _____ 260—78
2,623,031  12/1952  Snyder _____ 260—860
2,695,425  11/1954  Stott _____ 260—857

FOREIGN PATENTS 610,140  10/1948  Great Britain.
372,345   8/1964  France.

MURRAY TILLMAN, *Primary Examiner.*

GEORGE F. LESMES, *Examiner.*

P. LIEBERMAN, *Assistant Examiner.*